United States Patent
Takahashi et al.

(10) Patent No.: US 7,948,525 B2
(45) Date of Patent: May 24, 2011

(54) IMAGING DEVICE HAVING A LINEAR/LOGARITHMIC IMAGING SENSOR

(75) Inventors: Kazusei Takahashi, Nishinomiya (JP); Kiyoshi Takagi, Hachioji (JP); Yoshito Katagiri, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 267 days.

(21) Appl. No.: 11/887,191

(22) PCT Filed: Mar. 7, 2006

(86) PCT No.: PCT/JP2006/304302
§ 371 (c)(1),
(2), (4) Date: Sep. 25, 2007

(87) PCT Pub. No.: WO2006/103881
PCT Pub. Date: Oct. 5, 2006

(65) Prior Publication Data
US 2009/0141139 A1    Jun. 4, 2009

(30) Foreign Application Priority Data
Mar. 29, 2005 (JP) .................................. 2005-094400

(51) Int. Cl.
*H04N 5/228* (2006.01)
(52) U.S. Cl. ............... 348/222.1; 348/294; 348/333.02
(58) Field of Classification Search ............ 348/333.02, 348/294, 222.1
See application file for complete search history.

(56) References Cited

U.S. PATENT DOCUMENTS

| | | | |
|---|---|---|---|
| 6,191,408 B1* | 2/2001 | Shinotsuka et al. | 250/208.1 |
| 6,545,710 B1* | 4/2003 | Kubo et al. | 348/223.1 |
| 6,850,249 B1* | 2/2005 | Gu | 345/623 |
| 7,061,529 B2* | 6/2006 | Nakamura | 348/222.1 |
| 2002/0191082 A1* | 12/2002 | Fujino et al. | 348/211.14 |
| 2004/0179132 A1* | 9/2004 | Fujino et al. | 348/363 |
| 2004/0233304 A1* | 11/2004 | Kakumoto et al. | 348/241 |
| 2005/0001148 A1* | 1/2005 | Watanabe | 250/214 A |
| 2005/0052547 A1* | 3/2005 | Minakuti et al. | 348/224.1 |
| 2005/0052557 A1* | 3/2005 | Kusaka et al. | 348/308 |
| 2005/0264683 A1* | 12/2005 | Kamon et al. | 348/362 |
| 2005/0276496 A1* | 12/2005 | Molgaard et al. | 382/244 |

(Continued)

FOREIGN PATENT DOCUMENTS

| | | | |
|---|---|---|---|
| JP | 2001-218107 A | | 8/2001 |
| JP | 2001218107 A | * | 8/2001 |
| JP | 2004-88312 A | | 3/2004 |
| JP | 2004088312 A | * | 3/2004 |

*Primary Examiner* — Jason Chan
*Assistant Examiner* — Cynthia Calderon
(74) *Attorney, Agent, or Firm* — Cohen Pontani Lieberman & Pavane LLP

(57) ABSTRACT

An imaging device including: an imaging element which comprises a plurality of pixels capable of switching between a linear conversion operation for linearly converting incident light into an electric signal and a logarithmic conversion operation for logarithmically converting the incident light into an electric signal, according to an incident light quantity; a monitor to display an image obtained by the imaging element; an operation section which is operated for specifying an arbitrary area of the image displayed on the monitor; and an inflection point changing section which evaluates an output signal of the imaging element in the specified area, and changes the inflection point which is a boundary between a linear region and a logarithmic region in the output signal of the imaging element, based on an evaluation result of the output signal.

12 Claims, 8 Drawing Sheets

U.S. PATENT DOCUMENTS

| | | | |
|---|---|---|---|
| 2006/0001748 A1* | 1/2006 | Kamon et al. | 348/234 |
| 2006/0065811 A1* | 3/2006 | Yoon et al. | 250/208.1 |
| 2006/0268155 A1* | 11/2006 | Takagi et al. | 348/370 |
| 2006/0268371 A1* | 11/2006 | Kusuda et al. | 358/482 |
| 2009/0128650 A1* | 5/2009 | Takahashi et al. | 348/222.1 |

* cited by examiner

LEGEND A

1: IMAGING DEVICE
2: ENCLOSURE
3: LENS UNIT
4: IMAGING ELEMENT
5: EXPOSURE SECTION
6: LIGHT CONTROL SENSOR
9: BATTERY
10: RECORDING SECTION
16: RELEASE SWITCH
17: POWER SWITCH
18: USB TERMINAL

LEGEND B

4: IMAGING ELEMENT
9: BATTERY
10: RECORDING SECTION
11: MONITOR
12: ZOOM BUTTON W (WIDE ANGLE)
13: ZOOM BUTTON T (TELEPHOTO)
14: OPTICAL FINDER
15: CROSS-SHAPED KEY FOR SELECTION
16: RELEASE SWITCH
17: POWER SWITCH

IMAGING DEVICE HAVING A LINEAR/LOGARITHMIC IMAGING SENSOR

RELATED APPLICATION

This is a U.S. National Stage of International Application No. PCT/JP2006/304302 filed on 7 Mar. 2006.

This patent application claims priority of Japanese patent application no. JP 2005-094400 filed 29 Mar. 2005, the disclosure content of which is hereby incorporated by reference.

FIELD OF THE INVENTION

The present invention relates to an imaging device, particularly to an imaging device containing an imaging element that allows switching between a logarithmic conversion operation and a linear conversion operation.

BACKGROUND

In the conventional art, the imaging device of a camera unit or the like incorporated in a digital camera or on onboard camera has been provided with an photoelectric conversion imaging element for converting incident light into an electric signal. Recent years have witnessed a proposal of an imaging element (linear log sensor) capable of switching between a linear conversion operation and logarithmic conversion operation for electric signal according to the incident light quantity (Patent Documents 1 and 2).

When compared to an imaging element (linear sensor) that performs only the linear conversion operation, such an imaging element is characterized by wider dynamic range, and the entire luminance information can be represented by an electric signals even when a subject having a wide range of luminance has been imaged.

When compared to an imaging element (log sensor) that performs only the logarithmic conversion operation, the aforementioned imaging element avoids the problem wherein an decrease in amount of the data to be outputted, according to the luminance value, even within a predetermined range of luminance, with the result that a sufficient contrast of the subject can be ensured.

The linear log sensor is preferably used for imaging as a sensor having a photoelectric conversion function by fully utilizing respective advantages of each of the linear conversion operation and logarithmic conversion operation of the linear log sensor with respect to a main subject of imaging. To be more specific, when there is a wide range of the luminance of the captured image, the logarithmic conversion region of the imaging element is preferably used. When a sufficient contrast of the subject is desired, the linear conversion operation of the imaging element is preferably used to obtain sufficient data of electric signals in a specific luminance range for conducting an image processing.

Patent Document 1: Unexamined Japanese Patent Application Publication No. 2002-223392

Patent Document 2: Unexamined Japanese Patent Application Publication No. 2004-088312

DISCLOSURE OF INVENTION

Problems to be Solved by the Invention

Usually, the main subject of imaging is determined by a preference of each user, and there are cases where the main subject resides near the end of imaging frame, not only the cases where the main subject resides near the center. In these situations, when a system is utilized in which the imaging device automatically determines the main subject, in a case where the system recognizes a main subject which is different from what the user intended, and imaging is conducted with conditions suitable for the recognized subject, the image intended by the user may not be obtained.

Therefore, in order to obtain an image according to each user's need, it is preferable to conduct imaging by utilizing the advantages of linear conversion operation or logarithmic conversion operation with respect to the subject specified by the user.

The object of the present invention is to provide an imaging device having an imaging element capable of switching between a linear conversion operation and logarithmic conversion operation, wherein the user can easily captured a desired image.

Means for Solving the Problems

To solve the aforementioned problem, the invention described in Claim 1 provides an imaging device that includes:

an imaging element which comprises a plurality of pixels capable of switching between a linear conversion operation for linearly converting incident light into an electric signal and a logarithmic conversion operation for logarithmically converting the incident light into an electric signal, according to an incident light quantity;

a display section to display an image captured by the imaging element;

an operation section for specifying any arbitrary region within the image displayed in the display section;

an inflection point changing section which evaluates an output signal of the imaging element in the specified region and changes an inflection point of the imaging element according to the evaluation of the output signal, wherein the inflection point is a boundary between a linear region and a logarithmic region of output signals of the imaging element.

According to the invention described in Claim 1, the user is allowed to specify the desired subject region by the operation section after confirming the preview image of the subject displayed on the display section. Further, as the user changes the inflection point based on the evaluation result of the image data for the subject the user has specified, the photoelectric conversion characteristics can be changed according to the user's need.

The invention described in Claim 2 provides the imaging device described in Claim 1, wherein the inflection point changing section changes the inflection point such that at least the output signal of the specified region is processed with logarithmic conversion.

According to the invention described in Claim 2, as the imaging element performs the logarithmic conversion operation when capturing the image of the subject specified by the user, it is possible to capture the image having the advantage of the logarithmic conversion with respect to the subject specified by the user. Namely, as a wider dynamic range can be obtained, all the luminance information can be expressed by electric signals even when the subject of wide luminance range is image-captured.

The invention described in Claim 3 provides the imaging device described in Claim 2, wherein the inflection point changing section changes the inflection point when the output signal of the specified region is not less than a predetermined value.

In cases where the output signal of the specified region is not less than a predetermined value, the image of the specified subject becomes a white saturation image because of saturation of the output signal particularly when the imaging element conducts the linear conversion operation. According to the invention described in Claim 3, when the output signal of the specified region is not less than a predetermined value, the imaging element is allowed to conduct the logarithmic operation to assure a sufficient dynamic range for preventing the white saturation image of the user's specified subject.

The invention described in Claim 4 provides the imaging device described in Claim 1, wherein the inflection point changing section changes the inflection point such that at least the output signal of the specified region is processed with linear conversion.

According to the invention described in Claim 4, as the imaging element performs the linear conversion operation when capturing the image of the subject specified by the user, it is possible to capture the image having the advantage of the linear conversion with respect to the subject specified by the user. Namely, as sufficient data can be obtained within the predetermined luminance range, sufficient contrast can be achieved for the specified subject.

The invention described in Claim 5 provides the imaging device described in Claim 4, wherein when the output signal for the specified region is in the logarithmic conversion region, the inflection point changing section changes the inflection point such that the output signal processed with linear conversion can be obtained.

When the output signal for the user's specified region is in the logarithmic conversion region, as the data expressed within the predetermined luminance range width being less, the contrast of the image for the user's specified subject degrades. However, according to the invention described in Claim 5, the imaging element is allowed to perform the linear conversion operation to obtain sufficient data for the user's specified subject and to improve the contrast for the subject.

The invention described in Claim 6 provides the imaging device described in any one of Claims 1 to 5, wherein the display section displays a window for specifying an arbitrary region.

According to the invention described in Claim 6, the user is allowed to visually observe the region of the subject specified by the user.

The invention described in Claim 7 provides the imaging device described in any one of Claims 1 to 6, wherein at the operation section, a movement of the window in the display section and a change of the specified region by the window are capable.

According to the invention described in Claim 7, the user is allowed to easily specify the desired subject by operating the operation section to move the window on the display section or to change the specified region by the window.

The invention described in Claim 8 provides the imaging device described in any one of the Claims 1 through 7, wherein the inflection point changing section changes the inflection point by changing a voltage value set on the plurality of pixels of the imaging element.

According to the invention described in Claim 8, the inflection point of the output signal of the imaging element can be changed.

Effects of the Invention

According to the invention described in Claim 1, as the user changes the inflection point based on the evaluation result of the image data for the subject the user has specified, by changing the photoelectric conversion characteristics according to the user's need, the captured image desired by the user can be obtained.

According to the invention described in Claim 2, it is possible to capture the image having the advantage of the logarithmic conversion with respect to the subject specified by the user. Namely, by ensuring a wider dynamic range to express the wide luminance range with electric signals, even for a light subject with direct sun light exposure backward, a high quality image including the darker portion can be obtained.

According to the invention described in Claim 3, when image capturing the subject specified by the user, the imaging element is allowed to conduct the logarithmic operation to assure a sufficient dynamic range for preventing the white saturation image of the user's specified subject.

According to the invention described in Claim 4, it is possible to capture the image having the advantage of the linear conversion with respect to the subject specified by the user. Namely, as sufficient data can be obtained within the predetermined luminance range, sufficient contrast can be achieved for the specified subject. By this, even in cloudy or for dark subject in a shadow area, a high quality image with sufficient gradation can be obtained.

According to the invention described in Claim 5, the imaging element is allowed to perform the linear conversion operation to obtain sufficient data for the user's specified subject within the predetermined luminance range and to improve the contrast for the subject.

According to the invention described in Claim 6, the user is allowed to visually observe the region of the subject specified by the user by the window displayed in the display section.

According to the invention described in Claim 7, the user is allowed to easily specify the desired subject by operating the operation section to move the window on the display section or to change the specified region by the window.

According to the invention described in Claim 8, the inflection point of the output signal of the imaging element can be changed.

LEGEND

Figure 1:
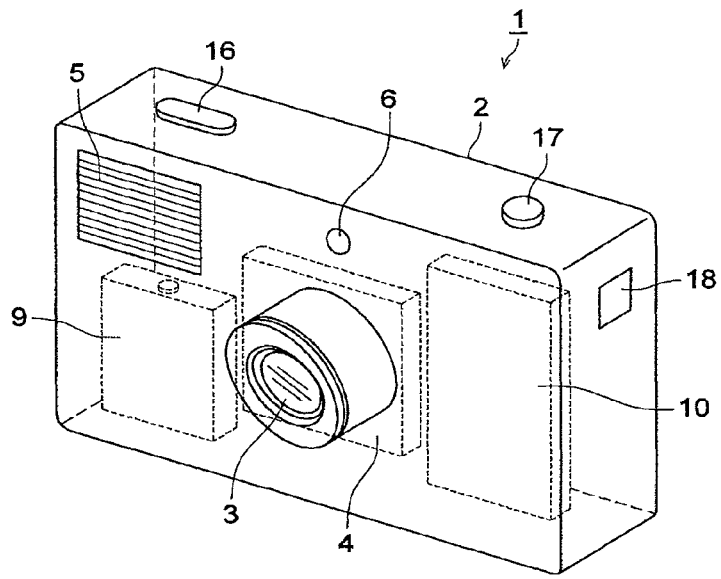
FIG. 1 is a front view representing the structure of the imaging device as a first embodiment of the present invention.

1. Imaging device
2. Enclosure
3. Lens unit
4. Imaging element
5. Exposure section
6. Light control sensor
7. System controller
8. Signal processing section
9. Battery
10. Recording section
11. Monitor
12. Zoom button W
13. Zoom button T
14. Optical finder
15. Cross-shaped key for selection
16. Release switch
17. Power switch
18. USB terminal
22. Lin-log inflection point changing section 22
27. Amplifier
28. Analog-to-digital converter
29. Black reference correcting section
30. AE evaluation value calculating section
31. WB processing section
32. Color interpolating section
33. Color correcting section
34. Gradation converting section
35. Color space converting section

BEST MODES FOR CARRYING OUT THE INVENTION

The following describes the embodiment of the present invention with reference to figures.

The imaging device 1 of the present embodiment is a compact type digital camera. The imaging device of the present invention includes a camera unit incorporated into the electronic equipment such as a mobile phone with camera and onboard camera in addition to the electronic equipment provided with a imaging function such as a single lens digital camera, mobile phone with camera and onboard camera.

As shown in FIG. 1, a lens unit 3 for converging the image light of the subject to a predetermined focus is arranged close to the center on the front of the enclosure 2 of the imaging device 1 in such a way that the optical axis of the lens unit 3 is perpendicular to the front surface of the enclosure 2. An imaging element 4 is arranged inside the enclosure 2 and on the rear of the lens unit 3 so that the light reflected from the subject launched through the lens unit 3 is photoelectrically converting into an electric signal.

An exposure section 5 for applying light at the time of imaging is arranged close to the upper end of the front surface of the enclosure 2. The exposure section 5 of the present embodiment is made of a stroboscope apparatus incorporated in the imaging device 1. It can also be made up of an external stroboscope and a high-luminance LED. Further, a light control sensor 6 is provided on the front surface of the enclosure 2 and close to the upper portion of the lens unit 3. The light applied from the exposure section 5 is reflected from the subject and the reflected light is received by this light control sensor 6.

Further, a circuit board (not illustrated) including the circuit such as a system controller 7 and a signal processing section 8 (FIG. 3) is provided inside the enclosure 2 of the imaging device 1. A battery 9 is incorporated inside the enclosure 2, and a recording section 10 such as a memory card is loaded therein.

Figure 2:
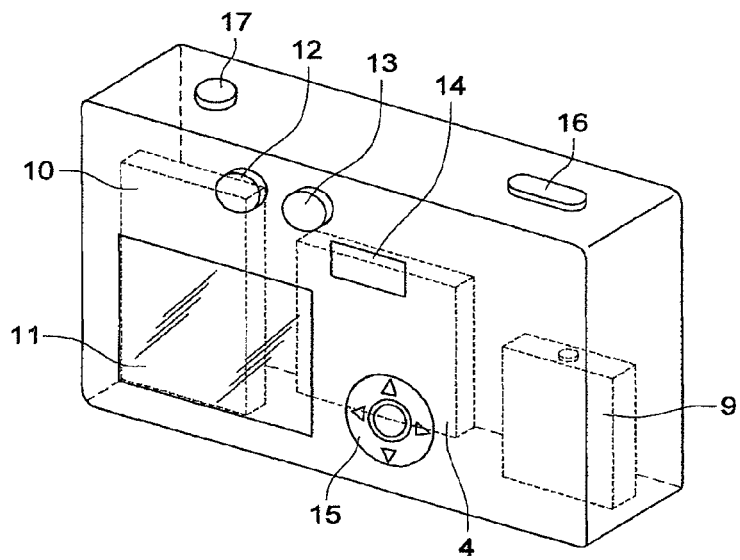
FIG. 2 is a rear view representing the structure of the imaging device as a first embodiment of the present invention.

Further, as shown in FIG. 2, a monitor 11 for image display is arranged on the rear surface of the enclosure 2. The monitor 11 is made up of an LCD (Liquid Crystal Display) and CRT (Cathode Ray Tube) so that the preview screen of the subject and captured image can be displayed.

Further, a zoom button W12 (W: wide angle) for adjusting the zoom and a zoom button T13 (T: telephoto) are provided close to the upper end of the rear surface of the imaging device 1. An optical finder 14 for checking the subject from the rear surface of the enclosure 2 is arranged on the rear surface of the imaging device 1 and above the lens unit 3.

Further, a cross-shaped key for selection 15 is arranged close to the center on the rear surface of the imaging device 1, and is provided with the cross key to move the cursor displayed on the screen of the monitor 11 or the window or to change the specified range of the window. A confirmation key for determining the contents specified by the cursor or window is arranged at the center of the cross-shaped key for selection 15.

A release switch 16 for releasing the shutter is provided on the upper surface of the imaging device 1 and between the battery 9 and lens unit 3. The release switch 16 can be set to two statuses—a halfway pressed status where the switch is pressed halfway and a fully pressed status where the switch is pressed fully.

Further, a power switch 17 is arranged close to the end of the upper surface of the enclosure 2, and is used to turn on or off the power of the imaging device 1 when pressed.

A USB terminal 18 for connecting the USB cable for connection with the personal computer is provided close to the upper end of one side of the enclosure 2.

Figure 3:
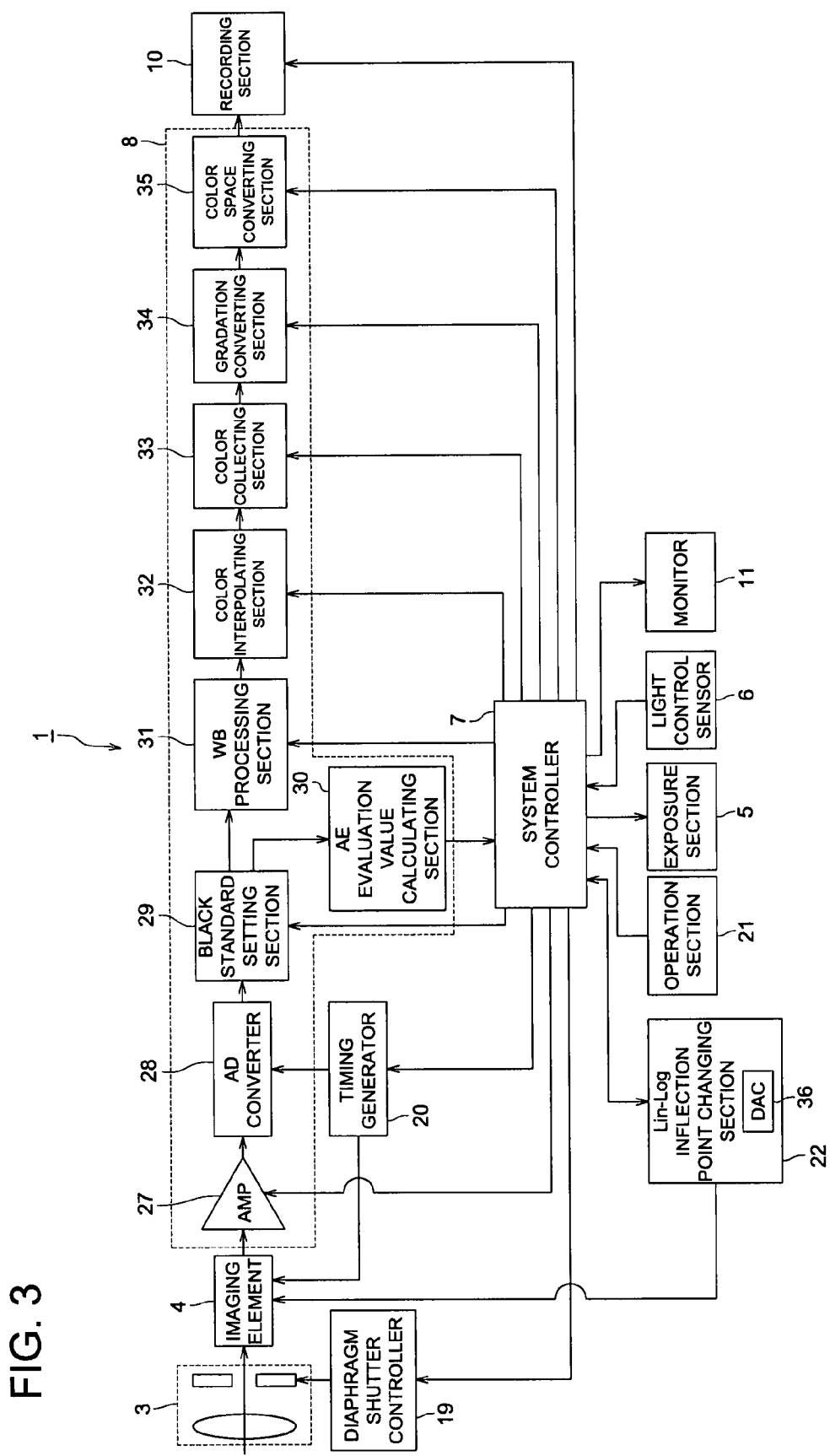
FIG. 3 is a block diagram representing the functional structure of the imaging device as a first embodiment of the present invention.

FIG. 3 shows the functional structure of the imaging device 1.

As described above, the imaging device 1 has a system controller 7 on the circuit board inside the enclosure 2. The system controller 7 includes a CPU (Central Processing Unit), a RAM (Random Access Memory) made up of a rewritable semiconductor element, and a ROM (Read Only Memory) made up of a nonvolatile semiconductor memory.

The system controller 7 is connected with components of the imaging device 1. The system controller 7 ensures that the processing program recorded on the ROM is displayed on the RAM, and this program is executed by the CPU, whereby these components are driven and controlled.

As shown in FIG. 3, the system controller 7 is connected with a lens unit 3, diaphragm/shutter controller 19, imaging element 4, signal processing section 8, timing generating section 20, recording section 10, exposure section 5, light control sensor 6, monitor 11, operation section 21 and inflection point changing section 22.

The lens unit 3 is made up of a plurality of lenses for forming the optical image of the subject on the image capturing surface of the imaging element 4; an aperture section for adjusting the amount of light converged from the lens; and a shutter section.

The diaphragm/shutter controller 19 controls the drive of the aperture shutter section for adjusting the amount of light converged by the lenses in the lens unit 3. Namely, based on the control value inputted from the system controller 7, the diaphragm/shutter controller 19 sets the aperture to a predetermined aperture value. The shutter is opened immediately before start of the imaging operation of the imaging element 4 and, after the lapse of a predetermined exposure time, the shutter is closed. When the imaging mode is not used, the light entering the imaging element 4 is blocked.

The imaging element 4 photoelectrically converts the incident light of color components of R, G and B as the optical images of the subject into electric signals, which are captured into the system.

Figure 4:
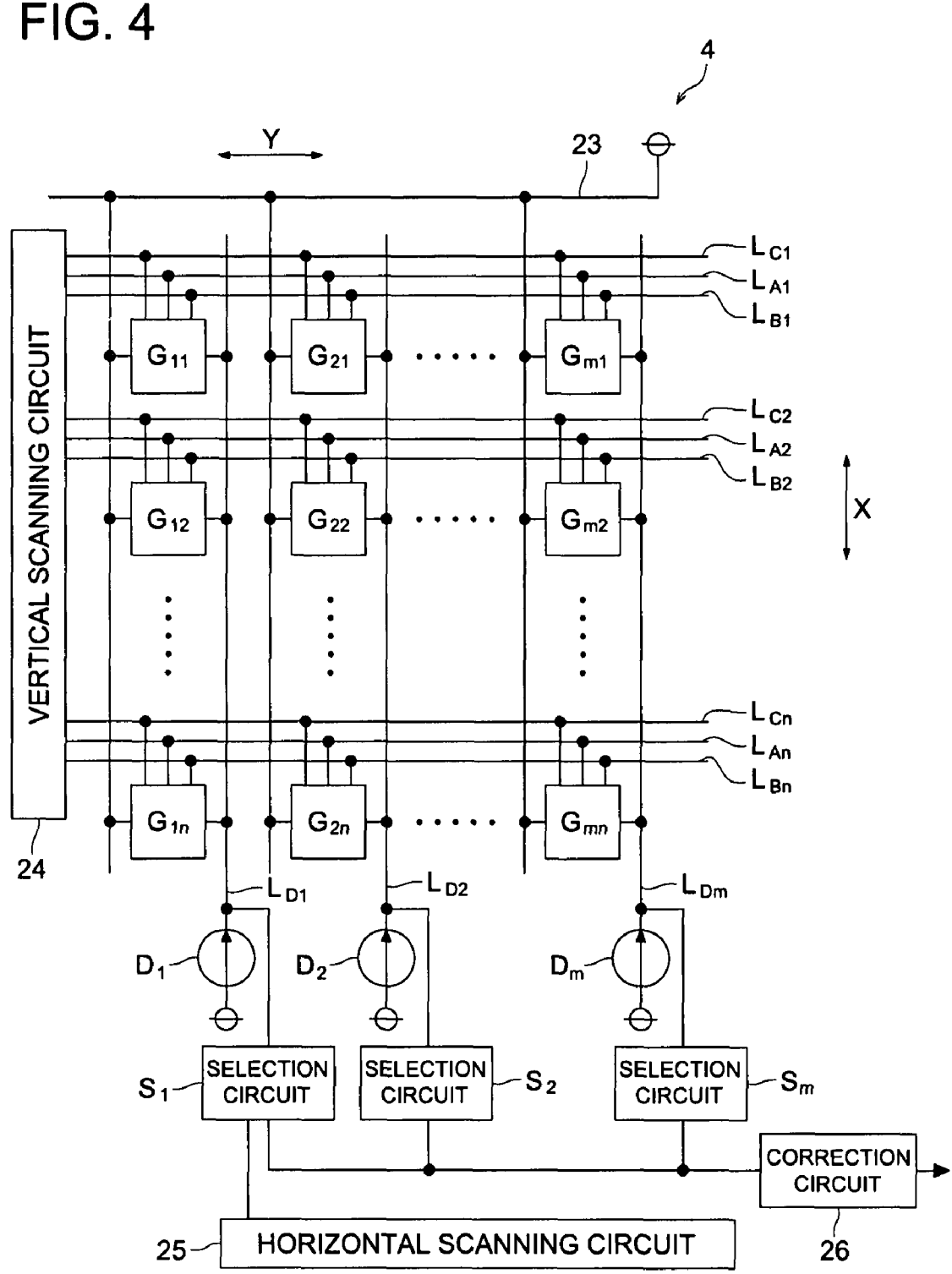
FIG. 4 is a block diagram representing the structure of the imaging element in the first embodiment of the present invention.

As shown in FIG. 4, the imaging element 4 contains a plurality of pixels $G_{11}$ through $G_{mn}$ (where each of n and m is an integer of 1 or more) arranged in a matrix array.

Each of the $G_{11}$ through $G_{mn}$ is used to output the electric signal through photoelectric conversion of the incident light. The $G_{11}$ through $G_{mn}$ permits switching of the operation of conversion of the electric signal in response to the amount of incident light. To put it in greater details, switching is performed between the linear conversion operation for linearly converting the incident light into an electric signal and the logarithmic conversion operation for logarithmic conversion. In the present embodiment, linear and logarithmic conversion of incident light into electric signal includes conversion into an electric signal wherein the time integral value of the amount of light is linearly changed, and logarithmic conversion into the electric signal wherein logarithmic conversion is performed.

A filter (not illustrated) of any one of the red, green and blue colors is arranged on the side of the lens unit 3 of pixels $G_{11}$ through $G_{mn}$. The pixels $G_{11}$ through $G_{mn}$ are connected with the power line 23, signal application lines $L_{A1}$ through $L_{An}$, $L_{B1}$ through $L_{Bn}$ and $L_{C1}$ through $L_{Cn}$, and signal read lines $L_{D1}$ through $L_{Dn}$, as shown in FIG. 4. The pixels $G_{11}$ through $G_{mn}$ are also connected with such a line as a clock line and bias supply. They are not shown in FIG. 4.

The signal application lines $L_{A1}$ through $L_{An}$, $L_{B1}$ through $L_{Bn}$ and $L_{C1}$ through $L_{Cn}$ give signals $\phi_V$, $\phi_{VD}$, $\phi_{VPS}$ (FIGS. 5 and 6) to the pixels $G_{11}$ through $G_{mn}$. The signal application lines $L_{A1}$ through $L_{An}$, $L_{B1}$ through $L_{Bn}$ and $L_{C1}$ through $L_{Cn}$ are connected with a vertical scanning circuit 24. The vertical scanning circuit 24 applies the signal to the signal application lines $L_{A1}$ through $L_{An}$, $L_{B1}$ through $L_{Bn}$ and $L_{C1}$ through $L_{Cn}$, based on the signal from the timing generating section 20 (FIG. 3). Signal application lines $L_{A1}$ through $L_{An}$, $L_{B1}$ through $L_{Bn}$ and $L_{C1}$ through $L_{Cn}$ for application of signals are sequentially switched in the direction of X.

The electric signal generated by the pixels $G_{11}$ through $G_{mn}$ is supplied to the signal read lines $L_{D1}$ through $L_{Dm}$. The signal read lines $L_{D1}$ through $L_{Dm}$ are connected with constant current sources $D_1$ through $D_m$ and selection circuits $S_1$ through $S_m$. The DC voltage $V_{PS}$ is applied to one end of the constant current sources $D_1$ through $D_m$ (on the lower end of the drawing).

The selection circuits $S_1$ through $S_m$ are used to sample-hold the noise signal given from the pixels $G_{11}$ through $G_{mn}$ through the signal read lines $L_{D1}$ through $L_{Dm}$ and the electric signal at the time of imaging. These selection circuits $S_1$ through $S_m$ are connected with a horizontal scanning circuit 25 and correction circuit 26. The horizontal scanning circuit 25 is used to ensure that the selection circuits $S_1$ through $S_m$ for sample-holding the electric signal and sending it to the correction circuit 26 are sequentially switched in the direction of Y. Further, based on the noise signal sent from the selection circuits $S_1$ through $S_m$ and the electric signal at the time of imaging, the correction circuit 26 removes the noise signal from this electric signal.

The circuits disclosed in the Unexamined Japanese Patent Application Publication No. Hei 2001-223948 can be used as the selection circuits $S_1$ through $S_m$ and correction circuit 26. In the explanation of the present embodiment, only one correction circuit 26 is provided for all the selection circuits $S_1$ through $S_m$. It is also possible to arrange a correction circuit 26 for each of the selection circuits $S_1$ through $S_m$.

Figure 5:
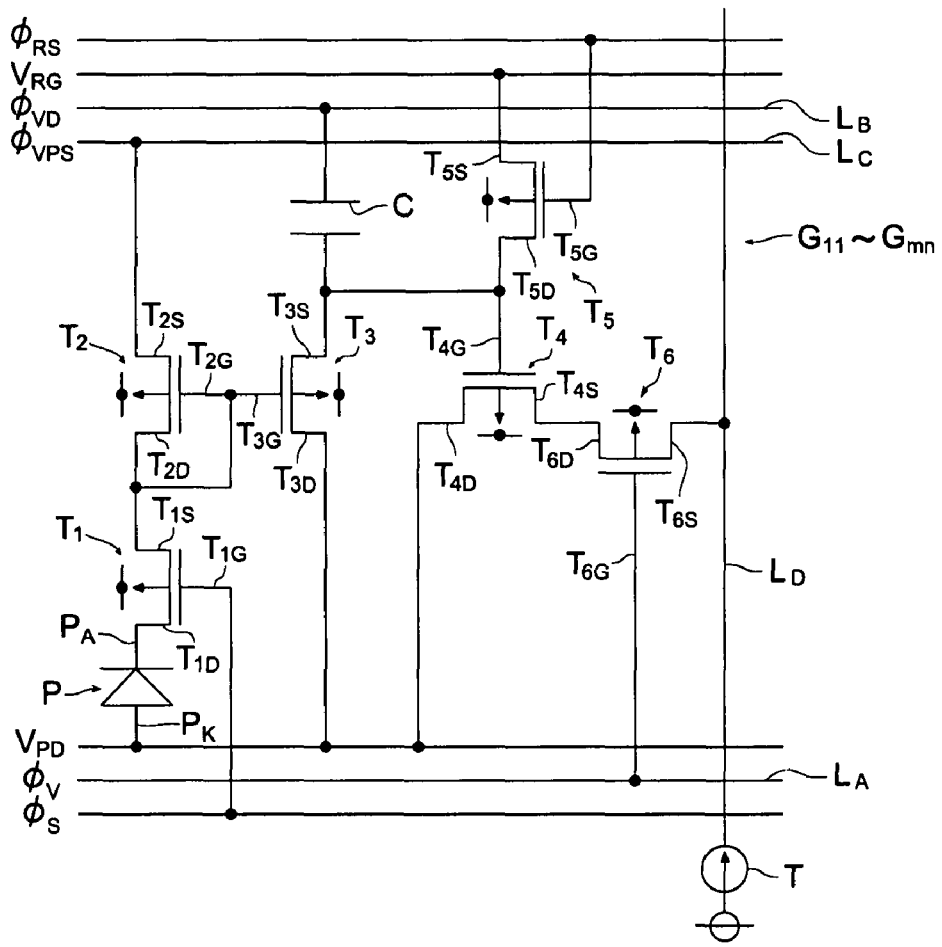
FIG. 5 is a circuit diagram of the structure of the pixels of the imaging element in the first embodiment of the present invention.

The following describes the pixels $G_{11}$ through $G_{mn}$ with which the imaging element 4 is provided:

As shown in FIG. 5, each of the pixels $G_{11}$ through $G_{mn}$ is provided with a photodiode P, transistors $T_1$ through $T_6$ and a capacitor C. The transistors $T_1$ through $T_6$ are MOS transistors of channel P.

The light having passed through the lens unit 3 is applied to the photodiode P. The DC voltage $V_{PD}$ is applied to the cathode $P_K$ of this photodiode P, and the drain $T_{1D}$ of the transistor $T_1$ is connected to the anode $P_A$.

A signal $\phi_S$ is inputted to the gate $T_{1G}$ of the transistor $T_1$, and the gate $T_{2G}$ of the transistor $T_2$ and the drain $T_{2D}$ are connected to the source $T_{1S}$.

Figure 6:
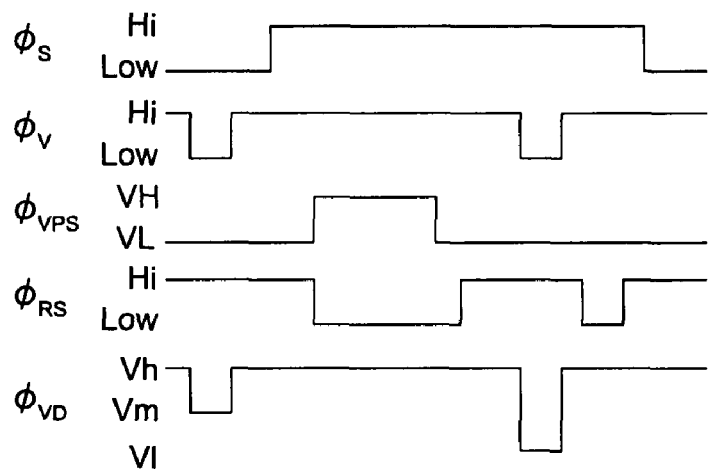
FIG. 6 is a time chart showing the operation of the pixels of the imaging element in the first embodiment of the present invention.

The source $T_{2S}$ of this transistor $T_2$ is connected to the signal application lines $L_C$ (corresponding to $L_{C1}$ through $L_{Cn}$ of FIG. 4). The signal $\phi_{VPS}$ is inputted through this signal application line $L_C$. As shown in FIG. 6, the signal $\phi_{VPS}$ is a binary voltage signal. To put it in greater details, it assumes two values—a voltage value VL for operating the transistor $T_2$ in the sub-threshold region when the incident light quantity has exceeded a predetermined incident light quantity and a voltage value VH for activating the transistor $T_2$.

The source $T_{1S}$ of the transistor $T_1$ is connected with the gate $T_{3G}$ of the transistor $T_3$. The DC current $V_{PD}$ of applied to the drain $T_{3D}$ of the transistor $T_3$. Further, the source $T_{3S}$ of the transistor $T_3$ is connected with one end of the capacitor C, the drain $T_{5D}$ of the transistor $T_5$, and the gate $T_{4G}$ of the transistor $T_4$.

The other end of the capacitor C is connected with the signal application lines $L_B$ (corresponding to $L_{B1}$ through $L_{Bn}$ of FIG. 4). The signal $\phi_{VD}$ is supplied from these signal application lines $L_B$. As shown in FIG. 6, the signal $\phi_{VD}$ is a ternary voltage signal. To put it in greater details, it assumes three values—a voltage value Vh at the time of integration of the capacitor C, a voltage value Vm at the time of reading the electric signal having been subjected to photoelectric conversion, and a voltage value Vl at the time of reading a noise signal.

The DC voltage $V_{RG}$ is inputted into the source $T_{5S}$ of the transistor $T_5$, and the signal $\phi_{RS}$ is inputted into the gate $T_{5G}$.

The DC voltage $V_{PD}$ is applied to the drain $T_{4D}$ of the transistor $T_4$, similarly to the case of the drain $T_{3D}$ of the transistor $T_3$, and the drain $T_{6D}$ of a transistor $T_6$ is connected to the source $T_{4S}$.

The source $T_{6S}$ of a transistor $T_6$ is connected with the signal read lines $L_D$ (corresponding to $L_{D1}$ through $L_{Dm}$ of FIG. 4), and the signal $\phi_V$ is inputted to the gate $T_{6G}$ from the signal application lines $L_A$ (corresponding to $L_{A1}$ through $L_{An}$ of FIG. 4).

Such a circuit configuration allows the pixels $G_{11}$ through $G_{mn}$ to be reset as follows:

In the first place, the vertical scanning circuit 24 allows the pixels $G_{11}$ through $G_{mn}$ to be reset as shown in FIG. 6. To put it more specifically, the signal $\phi_S$ is low, the signal $\phi_V$ is high, the signal $\phi_{VPS}$ is very low, the signal $\phi_{RS}$ is high, and the signal $\phi_{VD}$ is very high, to start with. From this state, the vertical scanning circuit 24 supplies the pulse signal $\phi_V$ and the pulse signal $\phi_{VD}$ of the voltage value Vm to the pixels $G_{11}$ through $G_{mn}$, then the electric signal is outputted to the signal read line $L_D$. Then the signal $\phi_S$ goes high and transistor $T_1$ is turned off.

Then when the vertical scanning circuit 24 allows the signal $\phi_{VPS}$ to go VH, the negative charges stored in the gate $T_{2G}$ of the transistor $T_2$, drain $T_{2D}$ and the gate $T_{3G}$ of the transistor $T_3$ are quickly coupled again. When the vertical scanning circuit 24 allows the signal $\phi_{RS}$ to go low, and the transistor $T_5$ to be turned on, the voltage at the node for coupling the capacitor C and the gate $T_{4G}$ of the transistor $T_4$ is initialized.

When the vertical scanning circuit 24 allows the signal $\phi_{VPS}$ to go VL, the potential of the transistor $T_2$ is set back to the original state. After that, the signal $\phi_{RS}$ goes high, and the transistor $T_5$ is turned off. Then the capacitor C performs the process of integration. This arrangement ensures that the voltage at the node for coupling the capacitor C with the gate $T_{4G}$ of the transistor $T_4$ conforms to the gate voltage of the transistor $T_2$ having been reset.

Then when the vertical scanning circuit 24 supplies the pulse signal $\phi_V$ to the gate $T_{6G}$ of the transistor $T_6$, the transistor $T_6$ is turned on and the pulse signal $\phi_{VD}$ of the voltage value V1 is applied to the capacitor C. In this case, the transistor $T_4$ acts as a source-follower type MOS transistor, and a noise signal is outputted to the signal read line $L_D$ as a voltage signal.

When the vertical scanning circuit 24 supplies the pulse signal $\phi_{RS}$ to the gate $T_{5G}$ of the transistor $T_5$, and the voltage at the node for coupling the capacitor C to the gate $T_{4G}$ of the transistor $T_4$ is reset. After that, the signal $\phi_S$ goes low, and the transistor $T_1$ is turned on. This arrangement terminates the reset operation, and puts the pixels $G_{11}$ through $G_{mn}$ ready for imaging.

The pixels $G_{11}$ through $G_{mn}$ are designed to perform the following imaging operations:

When the optical charge conforming to the incident light quantity is fed to the transistor $T_2$ from the photodiode P, the optical charge is stored in the gate $T_{2G}$ of the transistor $T_2$.

In this case, if the luminance of the subject is low, and the incident light quantity with respect to the photodiode P is smaller than the aforementioned predetermined incident light quantity, then the transistor $T_2$ is cut off. Accordingly, the voltage conforming to the amount of optical charge stored in the gate $T_{2G}$ of the transistor $T_2$ appears at this gate $T_{2G}$. Thus, the voltage resulting from the linear conversion of the incident light appears at the gate $T_{3G}$ of the transistor $T_3$.

On the other hand, if the luminance of a subject is high and the incident light quantity is greater than the aforementioned predetermined incident light quantity "th" with respect to the photodiode P, the transistor $T_2$ operates in the sub-threshold region. Thus, the voltage resulting from the logarithmic conversion of incident light by natural logarithm appears at the gate $T_{3G}$ of the transistor $T_3$.

It should be noted that, in the present embodiment, the aforementioned predetermined values are the same among the pixels $G_{11}$ through $G_{mn}$.

When the voltage appears at the gate $T_{3G}$ of the transistor $T_3$, the current flowing to the drain $T_{3D}$ of the transistor $T_3$ from the capacitor C is amplified in response to the amount of voltage. Thus, the voltage resulting from linear conversion or logarithmic conversion of the incident light of the photodiode P appears at the gate $T_{4G}$ of the transistor $T_4$.

Then the vertical scanning circuit 24 allows the voltage of the signal $\phi_{VD}$ to be Vm, and the signal $\phi_V$ to go low. Then the source current conforming to the voltage of the gate of the transistor $T_4$ is fed to the signal read line $L_D$ through the transistor $T_6$. In this case, the transistor $T_4$ acts as a source-follower type MOS transistor, and the electric signal at the time of imaging appears at the signal read line $L_D$ as a voltage signal. In this case, the signal value of the electric signal outputted through the transistors $T_4$ and $T_6$ is proportional to the gate voltage of the transistor $T_4$, so this signal value is the value resulting from the linear conversion or logarithmic conversion of the incident light of the photodiode P.

When the vertical scanning circuit 24 ensures that the voltage value of the signal $\phi_{VD}$ goes very high, and the signal $\phi_V$ goes high, the imaging operation terminates.

Figure 7:
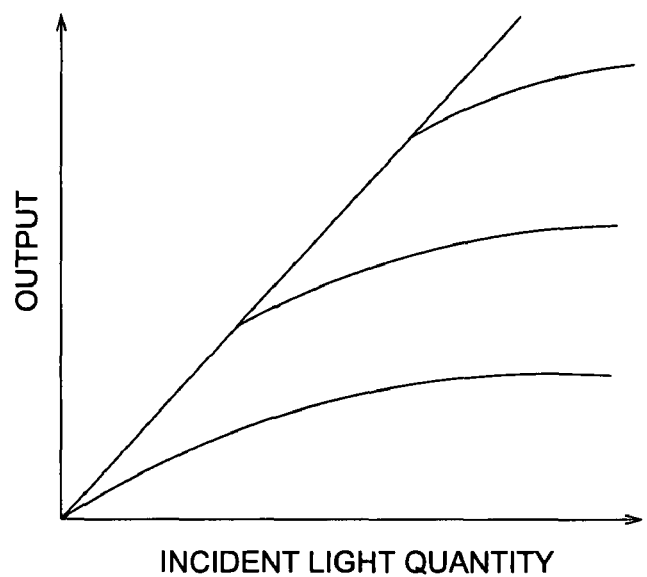
FIG. 7 is a chart showing the output with respect to the incident light amount of the imaging element in the embodiment of the present invention.

During the operation according to the aforementioned procedure, the voltage value VL of the signal $\phi_{VPS}$ goes low at the time of imaging. As the difference from the voltage value VH of the signal $\phi_{VPS}$ at the time of resetting is increased, the potential difference between the gate and source of the transistor $T_2$ is increased. This increases the percentage of the subject luminance wherein the transistor $T_2$ operates in the cut-off state. Accordingly, as shown in FIG. 7, a lower voltage value VL increases the percentage of the subject luminance having undergone linear conversion. As described above, the output signal of the imaging element 4 of the present embodiment continuously changes from the linear region to the logarithmic region in conformity to the incident light quantity.

Thus, if the subject luminance lies in a narrow range, the voltage value VL is decreased to increase the range of luminance for linear conversion; and if the subject luminance lies in a wide range, the voltage value VL is increased to increase the range of luminance for logarithmic conversion. This arrangement provides the photoelectric conversion characteristics conforming to the characteristics of the subject. It is also possible to arrange such a configuration that, whenever the voltage value VL is minimized, linear conversion mode is set; whereas, whenever the voltage value VH is maximized, logarithmic conversion mode is set.

The dynamic range can be changed over by switching the voltage value VL of the signal $\phi_{VPS}$ applied to the pixels $G_{11}$ through $G_{mn}$ of the imaging element 4 operating in the aforementioned manner. Namely, when the system control section 2 switches the voltage value VL of the signal $\phi_{VPS}$, it is possible to change the inflection point wherein the linear conversion operation of the pixels $G_{11}$ through $G_{mn}$ is switched to the logarithmic conversion operation.

The imaging element 4 of the present embodiment is only required to automatically switch between the linear conversion operation and logarithmic conversion operation in each pixel. The imaging element 4 may be provided with pixels having a structure different from that of FIG. 5.

In the present embodiment, switching between the linear conversion operation and logarithmic conversion operation is achieved by changing the voltage value VL of the signal $\phi_{VPS}$ at the time of imaging. It is also possible to arrange such a configuration that the inflection point between the linear conversion operation and logarithmic conversion operation is changed by changing the voltage value VH of the signal $\phi_{VPS}$ at the time of resetting. Further, the inflection point between the linear conversion operation and logarithmic conversion operation can be changed by changing the reset time.

Further, the imaging element 4 of the present embodiment is provided with the RGB filters for each pixel. It is also possible to arrange such a configuration that it is provided with other color filters such as cyan, magenta and yellow.

Going back to FIG. 3, the signal processing section 8 includes an amplifier 27, analog-to-digital converter 28, black reference correcting section 29, AE evaluation value calculating section 30, WB processing section 31, color interpolating section 32, color correcting section 33, gradation converting section 34 and color space converting section 35.

Of these, the amplifier 27 amplifies the electric signal outputted from the imaging element 4 to a predetermined level to make up for the insufficient level of the captured image.

The analog-to-digital converter 28 (ADC) ensures that the electric signal amplified in the amplifier 27 is converted from the analog signal to the digital signal.

The black reference correcting section 29 corrects the black level as the minimum luminance value to conform to the standard value. To be more specific, the black level differs according to the dynamic range of the imaging element 4. Accordingly, the signal level as the black level is subtracted from the signal level of each of the R, G and B signals outputted from the analog-to-digital converter 28, whereby the black reference correction is performed.

The AE evaluation value calculating section 30 detects the evaluation value required for the AE (automatic exposure) from the electric signal subsequent to correction of the black reference. To be more specific, the average value distribution range of the luminance is calculated by checking the luminance value of the electric signal made up of the color components of R, G and B, and this value is outputted to the system controller 7 as the AE evaluation value for setting the incident light quantity.

Further, by calculating the correction coefficient from the electric signal subsequent to black reference correction, the WB processing section 31 adjusts the level ratio (R/G, B/G) of the components R, G and B in the captured image, thereby ensuring correct display of white.

When the signal obtained in the pixel of the imaging element 4 is related to one or two out of primary colors, the color interpolating section 32 provides color interpolation for interpolating the missing color components for each pixel so as to obtain the values for the components R, G and B for each pixel.

The color correcting section 33 corrects the color component value for each pixel of the image data inputted from the color interpolating section 32, and generates the image wherein the tone of color of each pixel is enhanced.

In order to achieve the ideal gradation reproduction property from the input of the image to the final output wherein the gamma assumes the value of 1 to reproduce the image faithfully, the gradation converting section 34 provides gamma correction so that the responsive character of the image gradation is corrected to have the optimum curve conforming to the gamma value of the imaging device 1.

The color space converting section 35 changes the color space from the RGB to the YUV. The YUV is a color space management method for representing colors using the luminance (Y) signal and two chromaticities of blue color difference (U, Cb) and red color difference (V, Cr). Data compression of color difference signal alone is facilitated by converting the color space into the YUV.

The timing generating section 20 controls the imaging operation (charge storage and reading of the stored charges based on exposure) by the imaging element 4. To be more specific, based on the imaging control signal from the system controller 7, the timing generating section 20 generates a predetermined timing pulse (pixel drive signal, horizontal sync signal, vertical sync signal, horizontal scanning circuit drive signal, vertical scanning circuit drive signal, etc.), and outputs it to the imaging element 4. Further, the timing generating section 20 also generates the analog-to-digital conversion clock used in the analog-to-digital converter 28.

The recording section 10 is a recording memory made of a semiconductor memory or the like, and contains the image data recording region for recording the image data inputted from the signal processing section 8. The recording section 10 can be a build-in memory such as a flash memory, a detachable memory card or a memory stick, for example. Further, it can be a magnetic recording medium such as a hard disk.

If the luminance of the surrounding environment detected at the time of imaging of the subject is insufficient, the stroboscope as an exposure section 5 applies a predetermined-amount of light to the subject at a predetermined exposure timing under the control of the system controller 7.

To adjust the amount of the light applied from the exposure section 5, the light control sensor 6 detects the amount of light which is applied from the exposure section 5 and is reflected from the subject, and the result of detection is outputted to the system controller 7.

Figure 8:
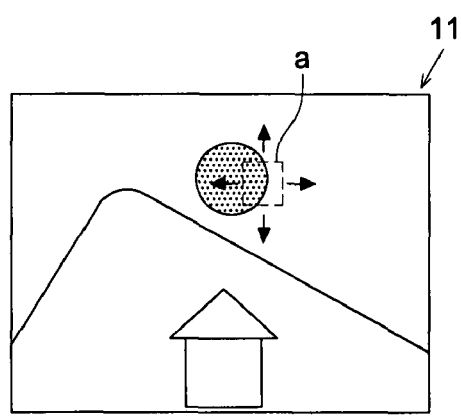
FIG. 8 is a diagram showing an example of the display screen of the display section in the embodiment of the present invention.

The monitor 11 performs the function of a display section. It show the preview screen of a subject, and displays the captured image having been processed on the signal processing section 8, based on the control of the system controller 7. At the same time, the monitor 11 displays the text screen such as the menu screen for the user to select functions. To be more specific, the monitor 11 shows an imaging mode selection screen for selecting the still image capturing mode or moving image capturing mode, and a stroboscope mode selection screen for selecting one of the automatic operation mode, off mode and on mode. Further, when the inflection point selection imaging mode is selected, the monitor 11 displays the window "a" on the preview screen as shown in FIG. 8.

The operation section 21 includes a zoom button W12, zoom button T13, cross-shaped key for selection 15, release switch 16 and power switch 17. When the user operates the operation section 21, the instruction signal corresponding to the function of the button and switch is sent to the system controller 7, and the components of the imaging device 1 are driven and controlled according to the instruction signal.

Of these, the cross-shaped key for selection 15 performs the function of moving the cursor and window on the screen of the monitor 11, when pressed. It also performs the function of determining the contents selected by the cursor or window when the confirmation key at the center is pressed.

To be more specific, when the cross-shaped key for selection 15 is pressed, the cursor displayed on the monitor 11 is moved, and the imaging mode selection screen is opened from the menu screen. Further, the cursor is moved to a desired imaging mode button on the imaging mode selection screen. When the confirmation key is pressed, the imaging mode can be determined.

Then, when the inflection point selection imaging mode is selected as the imaging mode, and the window "a" is displayed on the preview screen as shown in FIG. 8, the cross-shaped key for selection 15, when pressed, allow the window "a" move from side to side and up and down. Further, the area, which is specified by the window "a", can be changed by the area specifying operation using the cross-shaped key for selection 15. As described above, the user can specify by oneself the specific imaging subject and its area by changing the position of the window "a" and/or its area size.

Further, it is possible to make such arrangements that the monitor 11 is divided into two display screens, and one of the divided screens is made to be a preview screen. And a configuration is possible where the area specified by the window on the preview screen is displayed with enlarged on the other divided screen.

Figure 9:
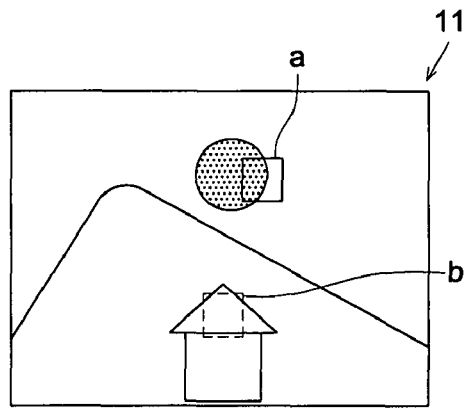
FIG. 9 is a diagram showing another example of the display screen of the display section in the embodiment of the present invention.

Further, in the present embodiment it is also possible to display plural screens of window "a" and window "b", as shown in FIG. 9. According to this configuration, the user can separately specifies each of the plural subjects.

When the zoom button W12 is pressed, the zoom is adjusted to reduce the size of the subject. When the zoom button T13 is pressed, the zoom is adjusted to increase the size of the subject.

Further, preparation for imaging starts when the release switch 16 is pressed halfway in the still image imaging mode. When the release switch 16 is pressed fully in the still image imaging mode, a series of imaging operation is performed. Namely, the imaging element 4 is exposed to light, and predetermined processing is applied to the electric signal obtained by the exposure. The result is stored in the recording section 10.

The on/off operations of the imaging device 1 are repeated by pressing the power switch 17.

Next, the inflection changing section 22, after evaluating the output signal, from imaging element, of the subject in the area specified by the user, determines the most preferable inflection point for displaying and imaging the specified subject based on the result of evaluation.

To be more specific, in the present embodiment, calculated is the distribution of output signal values, which are to be the image data in the area specified by the user. Then, the output signal value which has the highest distribution in the specified area is identified to be the output signal value in this specified area. And, the inflection point is determined based on the output value of the specified subject.

Evaluation of the output signals of the subject in the specified area is not restricted to the above-described method. For example, it may be applicable to obtain the average value of the output signals in the area specified by the user. Further, such the method of determining the inflection point by using the bare output signal value data of the specific pixel in the area specified by the user may be included in the method of evaluating the output signal value of the present embodiment.

The operation of changing the inflection point will be specifically described below.

Figure 10:
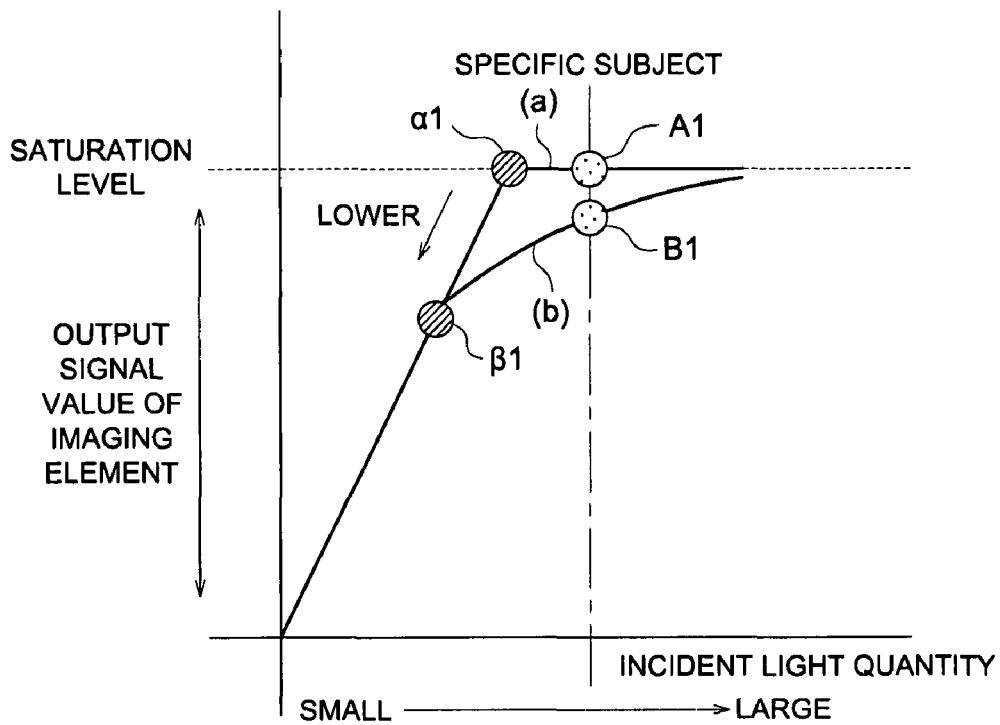
FIG. 10 is a graph representing the change of inflection point of the imaging element in the embodiment of the present invention.

As the case shown in FIG. 10, when the output signal value from the subject specified by the user positions at the point A1, which is in saturation region on the graph (a), the image of the subject becomes a white saturation image.

In this case, by changing the inflection point $\alpha_1$ on the graph (a) to inflection point $\beta_1$ on the graph (b), the output signal value of point A1 in the saturation level moves to the output signal value shown by B1 in logarithmic conversion region on the graph (b). In this way by moving the inflection point $\alpha_1$ down to the inflection point $\beta_1$, the output signal value of the subject specified by the user is transferred from the saturated level region of graph (a) to the imaging element output value on the graph (b) that is reproducible. Thus, the output signal value is decreased to lower than the saturated, dynamic range is assured, and the white saturation image of the subject specified by the user can be prevented. The inflection point of this case is preferably determined to be the largest possible output signal value in a region where output signal value of the specified subject does not saturate. According to this, by maximally ensuring the linear legion of the output signal, the white saturation image can be prevented without sacrificing contrast.

Namely, after evaluating the output signal value of the specified subject, the inflection point changing section 22 determines whether the output signal value of the specified subject is in the saturated level region or not. Then, in cases where the output signal value of the specified subject is in the saturated level region, in order to prevent the white saturation image, the inflection point changing section 22 lowers the inflection point to utilize the logarithmic conversion operation of the imaging element 4, thus the most preferable inflection point is determined.

Figure 11:
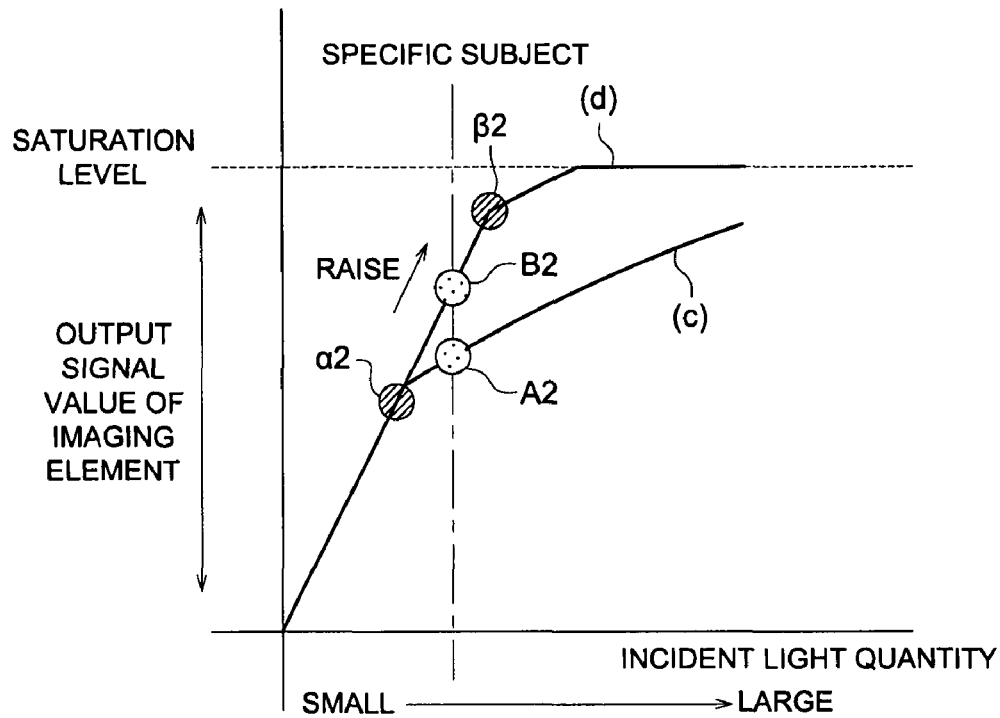
FIG. 11 is a graph representing the change of inflection point of the imaging element in the embodiment of the present invention.

On the other hand, as the case shown in FIG. 11, when the output signal value from the subject specified by the user positions at the point A2, which is in logarithmic conversion region on the graph (c), since sufficient data of the specified subject cannot be obtained, picked-up image of the specified subject has poor contrast.

In this case, by changing the inflection point $\alpha_2$ on the graph (c) to inflection point $\beta_2$ on the graph (d), the output signal value of point A2 in the logarithmic conversion region moves to the output signal value shown by $\beta_2$ in linear conversion region on the graph (d). In this way by raising the inflection point $\alpha_2$ up to the inflection point $\beta_2$, the output signal value of the subject specified by the user is transferred from the logarithmic conversion region of graph (c) to the output value in the linear conversion region on the graph (d). According to this, since the sufficient data of the specified subject is ensured, the contrast of the image can be improved.

Namely, in cases where the output signal value of the specified subject is in the logarithmic conversion region, in order to improve the contrast, the inflection point changing section 22 raises the inflection point to utilize the electric signal obtained through the linear conversion operation of the imaging element 4, thus the most preferable inflection point is determined.

Next, described below is the calculation, by the inflection point changing section 22, of the voltage value VL to be set for the imaging element 4 such that the inflection point is set based on the output signal value of the user-specified subject.

As described above, in the imaging element 4 of the present embodiment, the inflection point to switch the linear conversion operation into the logarithmic conversion operation is allowed to be changed by changing the voltage value VL of the signal $\phi_{VPS}$ to be applied onto the pixels $G_{11}$-$G_{mn}$ shown in FIG. 4.

Here, as a characteristic of output signal from the imaging element 4, the lower the voltage value VL is, the greater the rate of linear conversion region becomes. Therefore, in case of lowering the inflection point, namely in case of decreasing the rate of linear conversion region, the voltage value VL is supposed to be increased. And, in case of raising the inflection point, namely in case of increasing the rate of linear conversion region, the voltage value VL is supposed to be decreased. In this way the inflection point changing section 22 is configured to calculate the voltage value of the signal $\phi_{VPS}$ to be applied onto the pixels $G_{11}$-$G_{mn}$.

While, a configuration is also possible where a LUT previously formed by correlating the output signal value of the imaging element for the user-specified subject with the voltage value VL is stored in the inflection point changing section 22, and the voltage value VL is calculated by utilizing the LUT.

Further, in cases where as shown in FIG. 9 a plurality of subject are specified by a plurality of windows, window "a" and window "b", and the most preferable inflection point is determined for each subject, the voltage value VL is calculated for each of the subjects.

Further, the inflection point changing section 22 is provided with the DA converter 36, and by inputting the calculated voltage value VL after converting to analogue data into the pixels $G_{11}$-$G_{mn}$, the inflection point of the imaging element 4 is changed into the most preferable inflection point. When the user specified a plurality of subjects and the inflection point is determined for each subject, sequential image capturing is conducted with changing the respective most preferable inflection points.

Figure 12:
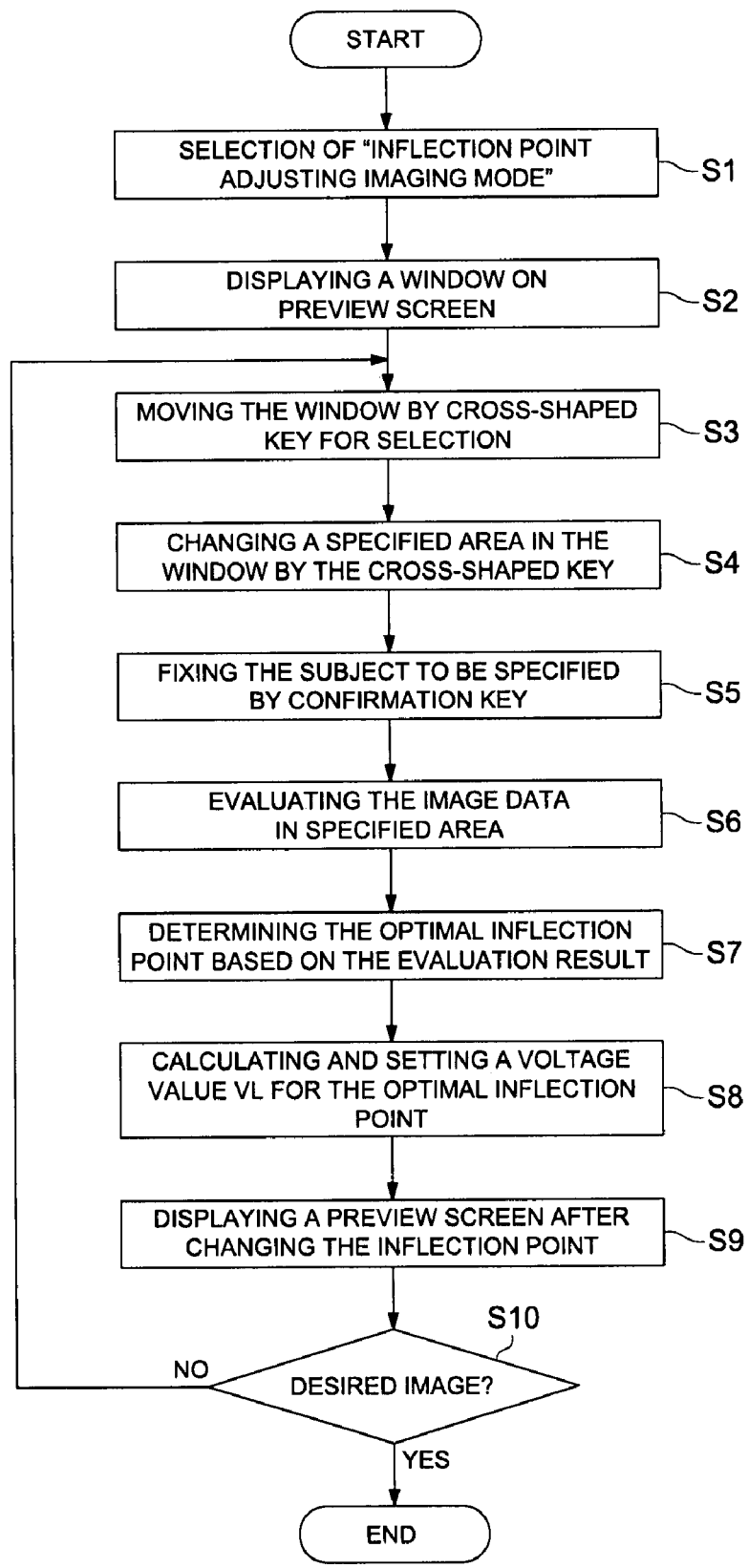
FIG. 12 is a flow chart showing the method of imaging in the embodiment of the present invention.

Next the operation relating to image capturing by using the imaging device 1 of the present embodiment will be described by referring to the FIG. 12.

When the power source is turned ON by pressing the power switch 17 of the imaging device 1, a preview screen of the subject is displayed on the monitor 11.

The user can adjust the image size displayed on the monitor 11 by adjusting the zoom through pressing the zoom button W12 or the zoom button T13 provided on the back face of the imaging device 1.

When the power is turned on, the imaging mode selection screen appears on the monitor 11. The imaging mode selection screen allows selection between the still imaging image capturing mode and the moving image capturing mode. The "inflection point adjusting imaging mode" is selected by operating the cross-shaped key for selection 15 on the imaging mode selection screen, and the confirmation key at the center is pressed. Then the imaging device 1 enters the inflection point adjusting imaging mode (Step S1), and the system goes to the display process. Then the window for selecting the subject appears on the preview screen of the monitor 11 (Step S2).

Figure 13:
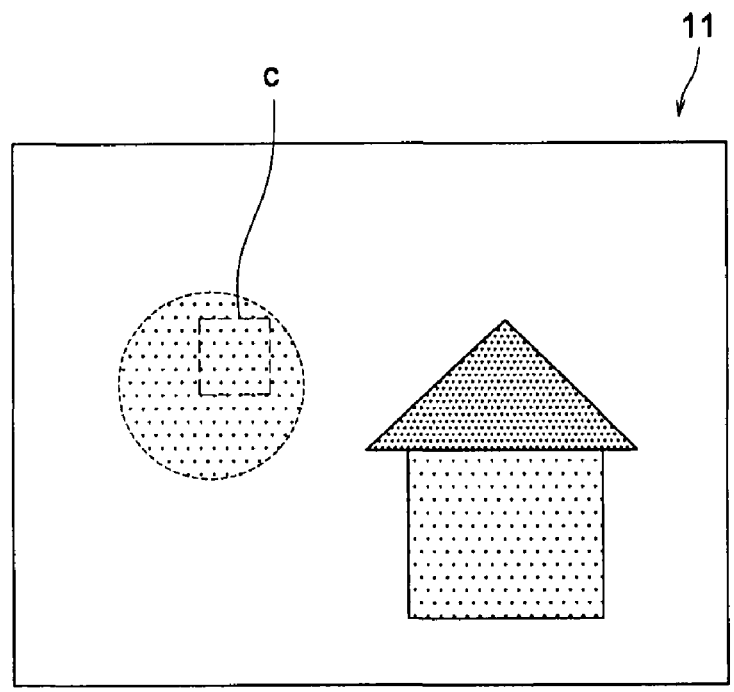
FIG. 13 is a diagram showing the display screen on the display section before the change of inflection point in the embodiment of the present invention.

Then the user operates the cross-shaped key for moving the window on the preview screen (Step 3) and changes the size of the window by area specifying operation of the cross-shaped key (Step 4) to specify the subject and area of imaging. Here, the order of Step 3 and Step 4 may be reversed. Then, as shown in FIG. 13, in the state that the window "c" is displayed on the subject which the user want to specify, and the confirmation key at the center is pressed, and the subject specified by the user is determined (Step 5).

After the subject specified by the user is determined on the preview screen of the monitor 11, the inflection point changing section 22 evaluates the image data of the user-specified subject (Step 6). Namely, in the present embodiment, calculated is the distribution of output signal values from the imaging element corresponding to the specified area, which are to be the image data in the area specified by the user. Then, evaluation is conducted such that the output signal value which has the highest distribution in the specified area is identified to be the output signal value in this specified area.

Then, the inflection point changing section 22 goes to the process of changing the inflection point, and determines the most preferable inflection point based on the output signal value of the specified subject (Step 7).

Next, the inflection point changing section 22 sets the inflection point of the imaging element 4 by calculating the voltage value VL based on the output signal value of the specified subject (Step 8). For example, in FIG. 13, when the output signal value of the specified subject is in the saturation level, the captured image of the specified subject becomes a white saturation image due to saturation of the output signal. Then, as shown in FIG. 10, the inflection point, which being the boundary between the linear region and the logarithmic region, of the output signal from the imaging element 4, is lowered. Namely, by changing the inflection point such that the output signal of the specified subject is positioned in the logarithmic region, the output signal is prevented from saturation, dynamic range of the imaging element is assured, and by expressing total image data in the specified output signal range, the white saturation image of the specified subject can be prevented.

On the other hand, when the output signal value from the subject specified by the user positions in logarithmic conversion region, since the data expressed in the prescribed luminance range is small in number, the contrast of the captured image becomes poor. Then, as shown in FIG. 11, the inflection point, which being the boundary between the linear region and the logarithmic region, of the output signal from the imaging element 4, is raised. Namely, by changing the inflection point such that the output signal of the specified subject is positioned in the linear region, the sufficient data of the specified subject is ensured, and the contrast of the image can be improved.

Namely, in the present embodiment, calculated is the distribution of output signal values from the imaging element corresponding to the specified area, which are to be the image data in the area specified by the user. Then, the output signal value, which has the highest distribution in the specified area, is identified to be the output signal value in this specified area. And, the inflection point is determined based on the output signal value of the specified subject.

In case of lowering the inflection point, namely incase of decreasing the rate of linear conversion region, the voltage value VL is to be decreased. And, in case of raising the inflection point, namely in case of increasing the rate of linear conversion region, the voltage value VL is to be increased. In this way, the inflection point changing section 22 calculates the voltage value VL for the signal $\phi_{VPS}$ to be applied onto the pixels $G_{11}$-$G_{mn}$.

While, the voltage value VL may be calculated by utilizing the LUT previously formed by correlating the output signal value for the user-specified subject with the voltage value VL (Step S7, S8).

Further, in cases where a plurality of subjects are specified by a plurality of windows, and the most preferable inflection points are determined for the respective subjects, the voltage values VL are calculated for the respective subjects.

And, the AD converter provided on the inflection point changing section 22 converts the calculated voltage value VL into analogue data, inputs to the pixels $G_{11}$-$G_{mn}$ of the imaging element 4, and changes the inflection point of the imaging element 4. As shown in FIG. 9, when a plurality of subjects are specified by a plurality of windows "a" and windows "b", inflection points for respective subjects are allowed to be determined.

Figure 14:
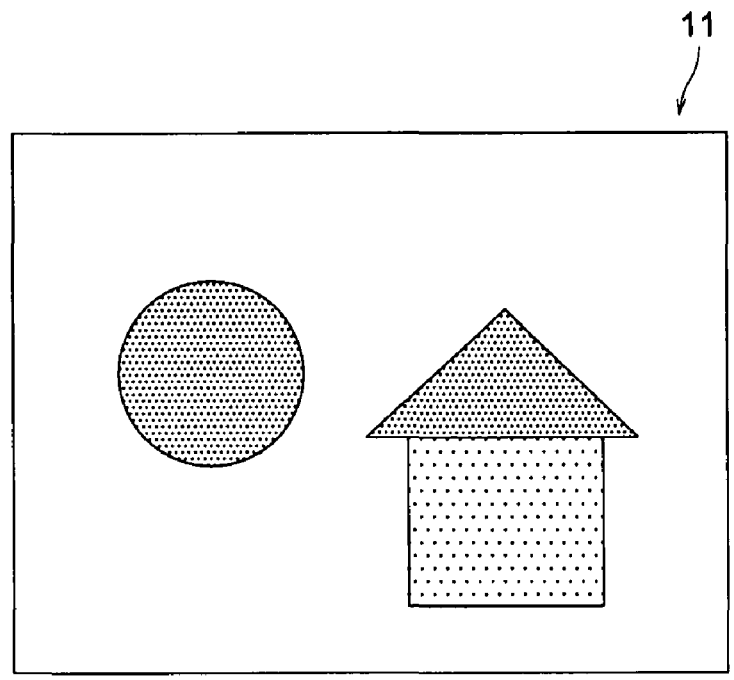
FIG. 14 is a diagram showing the display screen on the display section after the change of inflection point in the embodiment of the present invention.

Then, the monitor 11 displays the preview screen after changing the inflection point as shown in FIG. 14 (Step S9). In FIG. 14, the white saturation image for the user-specified subject is prevented by changing the inflection point.

Here, the user views the captured image displayed in the preview screen, and confirms if a desired image can be obtained or not (Step S10). And if there is a subject for which is further desired to prevent the white saturation image or to improve the gradation of the subject image, (Step S10; NO), the procedure returns to Step S3, moves again the window displayed on in the preview screen, changes the specified area in the window (Step S4), and specifies the subject (Step S5).

Then, in cases where a desired captured image is confirmed to be obtained by changing the inflection point on the preview screen in the monitor 11 (Step S10; YES), by halfway pressing the release switch 16, AE evaluation value is calculated in addition to performing AF operation, which being an image capturing preparation operation. In cases where the release switch 16 is not pressed, the preview screen after changing the inflection point is still displayed on the monitor 11.

After that, when the user presses the release switch 16 all the way down, image capturing is conducted.

Based on the AE evaluation value calculated by the AE evaluation value calculating section 32 the diaphragm/shutter controller 19 controls the diaphragm and shutter. Then the pixels $G_{11}$ through $G_{mn}$ of the imaging element 4 allow the incident light to undergo photoelectric conversion by switching between the linear conversion operation and logarithmic conversion operation at the inflection point determined by the inflection point changing section 22. The electric signal obtained by photoelectric conversion is outputted to the signal processing section 8.

The signal processing section 8 applies a predetermined image processing to the electric signal obtained by photoelectric conversion. To be more specific, when the electric signal outputted from the imaging element 4 is amplified to a predetermined level by the amplifier 27, the amplified electric signal is converted into a digital signal by the A/D converter 28.

Then the black level wherein the luminance is minimized is corrected to the standard value by the black reference correcting section 29. The AE evaluation value calculating section 30 detects the evaluation value required for AE (automatic exposure) from the electric signal subsequent to black reference correction, and sends it to the system controller 7. In the meantime, the WB processing section 31 calculates the correction coefficient from the electric signal subsequent to black reference correction, whereby the level ratio (R/G, B/G) of the components R, G and B is adjusted to ensure correct display of white.

The color interpolating section 32 applies a process of color interpolation wherein the missing component is interpolated for each pixel. The color correcting section 33 corrects the color component value for each pixel, and generates the image wherein the tone of color of each pixel is enhanced. When the gradation converting section 34 has applied the process of gamma correction wherein the response characteristic of the gradation of an image is corrected to have the optimum curve conforming to the gamma value of the imaging device 1, the color space converting section 35 converts the color space from the RGB to the YUV.

The image data outputted from the signal processing section 8 is recorded in the recording section 10.

Further, in cases where the user specifies plural subject and the inflection points are determined for the respective subjects, respective previews are conducted in conditions that the inflection points are respectively changed and then plural times of image capturing are conducted. In this case, plural captured images may be concurrently recorded, any one of the images may be recorded, or a composite image of the plural images may be recorded.

When the image data recorded in the recording section 10 is to be read into the personal computer or the like, the USB cable linked to the USB terminal 18 is connected to the personal computer.

According to the present embodiment, the user is allowed to specify the subject area, where the user require to desirably reproduce, by operating the operation section after confirming the preview screen displayed on the monitor 11. And since the inflection point is changed based on the evaluation result of the output signal value for the user-specified subject, the photoelectric conversion characteristic of the imaging element 4 can be changed according to the user needs.

Further, in case of image capturing the specified subject, by allowing the imaging element 4 to perform the logarithmic conversion operation, it become possible to obtain a captured image of the subject by utilizing the advantage of the logarithmic conversion. To be more specific, since wider dynamic range is ensured, it become possible to express the total subject by reproducible imaging signals even in case of image capturing the subject of wide luminance range.

Here, in cases where the output signal value of the specified subject is in saturation level, by changing the inflection point such that the output signal value comes into logarithmic conversion region, the dynamic range is ensured and the white saturation image of the specified subject can be prevented.

Further when image capturing the specified subject, by allowing the imaging element 4 to perform the linear conversion operation, it becomes possible to obtain a captured image with utilizing the advantage of the linear conversion operation. Namely, by obtaining sufficient data, the contrast of the subject image can be improved.

While, in cases where the output signal value of the specified subject in the logarithmic conversion region, by changing the inflection point such that the output signal value comes into the linear conversion region, by obtaining sufficient data, the contrast of the subject image can be improved, by obtaining sufficient data.

Further, due to the window displayed in the monitor 11, the subject area specified by the user in the captured image can be easily viewed.

Further, the user can easily specify the desired subject by moving the window in the monitor 11, or by changing the specified area of the window while operating the operation section 21.

As described above, the imaging device of the present invention allows the inflection point to be changed based on the evaluation result of the output signal value for the subject specified by the user, changes the photoelectric conversion characteristic of the imaging element according to the user's needs, and makes it possible to obtain the captured image as the user intended.

Further, it becomes possible to obtain a captured image of subject specified by the user, with utilizing the advantage of logarithmic conversion operation. Namely, by expressing the total luminance information with electric signals while ensuring the sufficient dynamic range, a high quality image including a shadow portion can be obtained even for the subject having bright background with direct sunlight.

Further, when image capturing the user specified subject, by allowing the imaging element to perform the logarithmic conversion operation, the dynamic range of electric signals is ensured and the white saturation image of the main subject can be prevented.

Further, it becomes possible to obtain the captured image of the subject specified by the user, by utilizing the advantage of logarithmic conversion operation. Namely, by obtaining sufficient data within a prescribed luminance range and improving the contrast of the subject image, a high quality image with sufficient gradation can be obtained, even for a dark subject in shadow area or in cloudy condition.

Further, when image capturing the user specified subject, by allowing the imaging element to perform the linear conversion operation, and obtaining sufficient data within a prescribed luminance range, the contrast of the subject image can be improved.

Further, by the window displayed in the display section, the user can easily view the subject area specified.

Further, it becomes possible for the user to easily specify a desired subject by moving the window in the display section, or by changing the specified area of the window while operating the operation section.

What is claimed is:

1. An imaging device comprising:
an imaging element which comprises a plurality of pixels capable of switching between a linear conversion operation for linearly converting incident light into an electric signal and a logarithmic conversion operation for logarithmically converting the incident light into an electric signal, according to a quantity of incident light;
a monitor for displaying an image obtained by the imaging element;
an operation section which is operable to specify an arbitrary area of the image displayed on the monitor; and
an inflection point changing section configured to evaluate whether an output signal of the imaging element in the specified arbitrary area is in a saturation level in relation to the quantity of incident light or whether the output signal is in a logarithmic conversion region, and which changes an incident light intensity value of the inflection point which forms a boundary between a linear region and a logarithmic region in the output signal of the imaging element based on an evaluation result of the output signal.

2. The imaging device described in claim 1, wherein when the evaluation result of the output signal of the imaging element in the specified arbitrary area is in the saturation level in relation to the quantity of incident light, the inflection point changing section changes the inflection point such that the output signal of the specified arbitrary area is at least logarithmically converted.

3. The imaging device described in claim 2, wherein a window for specifying the arbitrary area in the image is displayed on the monitor.

4. The imaging device described in claim 2, wherein the inflection point changing section changes the incident light intensity value of the inflection point by changing a voltage value set on the plurality of pixels of the imaging element.

5. The imaging device described in claim 1, wherein when the evaluation result of the output signal of the specified arbitrary area is within the logarithmic region, the inflection point changing section changes the incident light intensity value of the inflection point such that the output of the linear conversion can be obtained from the output signal of the specified arbitrary area.

6. The imaging device described in claim 5, wherein a window for specifying the arbitrary area in the image is displayed on the monitor.

7. The imaging device described in claim 5, wherein the inflection point changing section changes the incident light intensity value of the inflection point by changing a voltage value set on the plurality of pixels of the imaging element.

8. The imaging device described in claim 1, wherein a window for specifying the arbitrary area in the image is displayed.

9. The imaging device described in claim 8, wherein the inflection point changing section changes the incident light intensity value of the inflection point by changing a voltage value set on the plurality of pixels of the imaging element.

10. The imaging device described in claim 1, wherein moving a window on the monitor and changing the arbitrary area specified by the window are possible at the operation section.

11. The imaging device described in claim 10, wherein the inflection point changing section changes the intensity light intensity value of the inflection point by changing a voltage value set on the plurality of pixels of the imaging element.

12. The imaging device described in claim 1, wherein the inflection point changing section changes the incident light intensity value of the inflection point by changing a voltage value set on the plurality of pixels of the imaging element.

* * * * *